United States Patent
Suga

(10) Patent No.: US 8,565,776 B2
(45) Date of Patent: Oct. 22, 2013

(54) RADIO COMMUNICATION APPARATUS AND SCHEDULING METHOD

(75) Inventor: Junichi Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 270 days.

(21) Appl. No.: 12/815,683

(22) Filed: Jun. 15, 2010

(65) Prior Publication Data

US 2010/0317359 A1 Dec. 16, 2010

(30) Foreign Application Priority Data

Jun. 16, 2009 (JP) .................................. 2009-143696

(51) Int. Cl.
*H04W 72/00* (2009.01)

(52) U.S. Cl.
USPC ........ 455/450; 455/447; 455/422.1; 370/328; 370/338

(58) Field of Classification Search
USPC ............... 455/447–450, 442.1, 456.1–457, 7, 455/560, 561, 406–408, 436, 442, 33.1, 455/33.4; 370/328–338
See application file for complete search history.

(56) References Cited

U.S. PATENT DOCUMENTS 5,649,292 A * 7/1997 Doner ........................... 455/447
2008/0032726 A1 * 2/2008 Tajima et al. .................. 455/509

OTHER PUBLICATIONS

Wimax Forum, "Mobile WiMAX—Part I: A Technical Overview and Performance Evaluation", Feb. 21, 2006.

* cited by examiner

*Primary Examiner* — Chuong A Ngo
(74) *Attorney, Agent, or Firm* — Fujitsu Patent Center

(57) ABSTRACT

A base station configuring a plurality of sectors adjacent to one another and controlling communication with a plurality of mobile stations, the base station including: a position determination unit configured to determine, for the mobile stations, a mobile station present at a sector boundary and in the vicinity of the base station; and a scheduling unit configured to allocate, to the determined mobile station, a frequency domain that is not used in a sector adjacent to a sector in which the determined mobile station is present.

10 Claims, 18 Drawing Sheets

FIG.4

| ROW NUMBER | SECTOR NUMBER | MOBILE STATION ID | ZONE | ADJACENT SECTOR NUMBER | NUMBER OF SUBCHANNELS |
|---|---|---|---|---|---|
| 1 | 1 | 1a | R1 ZONE | — | 10 |
| 2 | 1 | 1b | R3 ZONE | 2 | 6 |
| 3 | 1 | 1c | R3 ZONE | 3 | 4 |
| 4 | 1 | 1d | R3 ZONE | — | 4 |
| 5 | 1 | ‥ | ‥ | ‥ | ‥ |
| 6 | 2 | 2a | R1 ZONE | — | 15 |
| 7 | 2 | 2b | R3 ZONE | — | 9 |
| 8 | 2 | 2c | R3 ZONE | 1 | 5 |
| 9 | 2 | ‥ | ‥ | ‥ | ‥ |
| 10 | 3 | 3a | R3 ZONE | 2 | 4 |
| 11 | 3 | 3b | R3 ZONE | 1 | 4 |
| 12 | 3 | 3c | R3 ZONE | — | 6 |
| 13 | 3 | 3d | R1 ZONE | — | 9 |
| 14 | 3 | ‥ | ‥ | ‥ | ‥ |

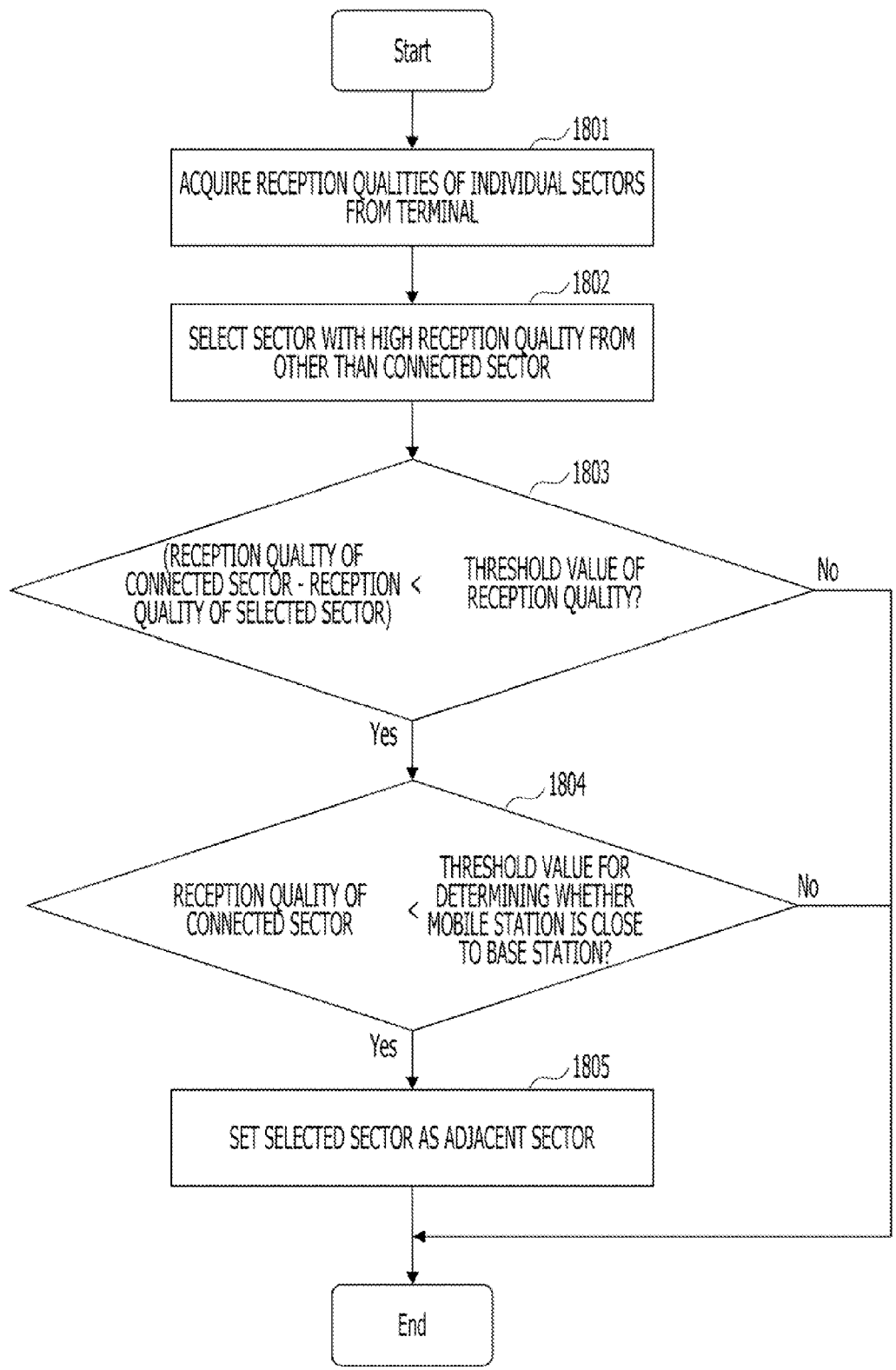

RADIO COMMUNICATION APPARATUS AND SCHEDULING METHOD

CROSS-REFERENCE TO RELATED APPLICATIONS

This application is based upon and claims the benefit of priority from the prior Japanese Patent Application No. 2009-143696 filed on Jun. 16, 2009, the entire contents of which are incorporated herein by reference.

FIELD

The embodiments discussed herein are related to a radio communication apparatus and a scheduling method.

BACKGROUND

Mobile communication systems that use orthogonal frequency division multiplexing (OFDM) or orthogonal frequency division multiple access (OFDMA) often use frequency allocation so as to use different frequency resources among adjacent cells because the use of the same frequency resource by adjacent cells at the same time causes mutual interference. In this case, dividing the frequency resources and allocating the divided different frequency resources to the individual cells results in an extremely small frequency resource that may be used by each cell. Therefore, the frequency resources are reused by repeatedly using the same frequency resource among cells that are not adjacent to one another.

For the frequency allocation, fractional frequency reuse (FFR) attracts attention as a technology for further increasing the frequency use efficiency. With FFR, a base station uses a frequency domain different from adjacent base stations (R3 zone: a frequency domain that uses one third of all subchannels to achieve a frequency reuse coefficient of 3) and a frequency domain common to adjacent base stations (R1 zone: a frequency domain that uses all subchannels to achieve frequency reuse coefficient of 1). The different frequency domain is used for communication with a mobile station with low radio quality located at the boundary of sectors or at the edge of a cell. The common frequency domain is used for communication with a mobile station with high radio quality located in the vicinity of the base station. This allows the frequency use efficiency to be increased.

If a mobile station located at the boundary of sectors uses the same frequency as that of adjacent sectors, the value of the preamble signal to interference and noise ratio (SINR) of the mobile station is small because of significant interference from the adjacent sectors. The preamble signal is a synchronizing signal sent by the sectors, for which the same frequency is used by all the sectors. Therefore, in selecting a zone for a mobile station based on the preamble SINR for FFR, the R3 zone is selected for a mobile station located at the boundary of the sectors.

RELATED-ART DOCUMENT

Nonpatent Document

[Nonpatent Document 1] WiMAX Forum, Mobile WiMAX—Part I: A Technical Overview and Performance Evaluation, Feb. 21, 2006

SUMMARY

According to an aspect of the embodiments, a base station configuring a plurality of sectors adjacent to one another and controlling communication with a plurality of mobile stations, the base station including: a position determination unit configured to determine, for the mobile stations, a mobile station present at a sector boundary and in the vicinity of the base station; and a scheduling unit configured to allocate, to the determined mobile station, a frequency domain that is not used in a sector adjacent to a sector in which the determined mobile station is present.

Additional objects and advantages of the invention will be set forth in part in the description which follows, and in part will be obvious from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 4 is a diagram of an example of data stored in a storage unit;

FIG. 18 is a diagram of an example of the flow of determining the adjacent sector of the mobile station based on the reception qualities of the individual sectors acquired in FIG. 17.

DESCRIPTION OF EMBODIMENTS

Since the known base station selects a zone to be used by a mobile station based on the preamble signal to interference and noise ratio (SINR), the R3 zone is always selected for a mobile station located at the boundary between it and the adjacent sectors. Accordingly, the data of a mobile station located in the vicinity of the base station and at the sector boundary is allocated to a frequency domain different from that of the adjacent sectors, in other words, the R3 zone, although located in the vicinity of the base station.

Furthermore, since the known base station performs a communication process for individual sectors, in other words, for individual antennas, the base station allocates a frequency domain to the mobile stations irrespective of the frequency utilization of the adjacent sectors.

The present technology can increase the frequency use efficiency by allocating a frequency domain in consideration of the frequency use efficiency of the adjacent sectors.

Frequency Allocation to Sectors

Figure 1:
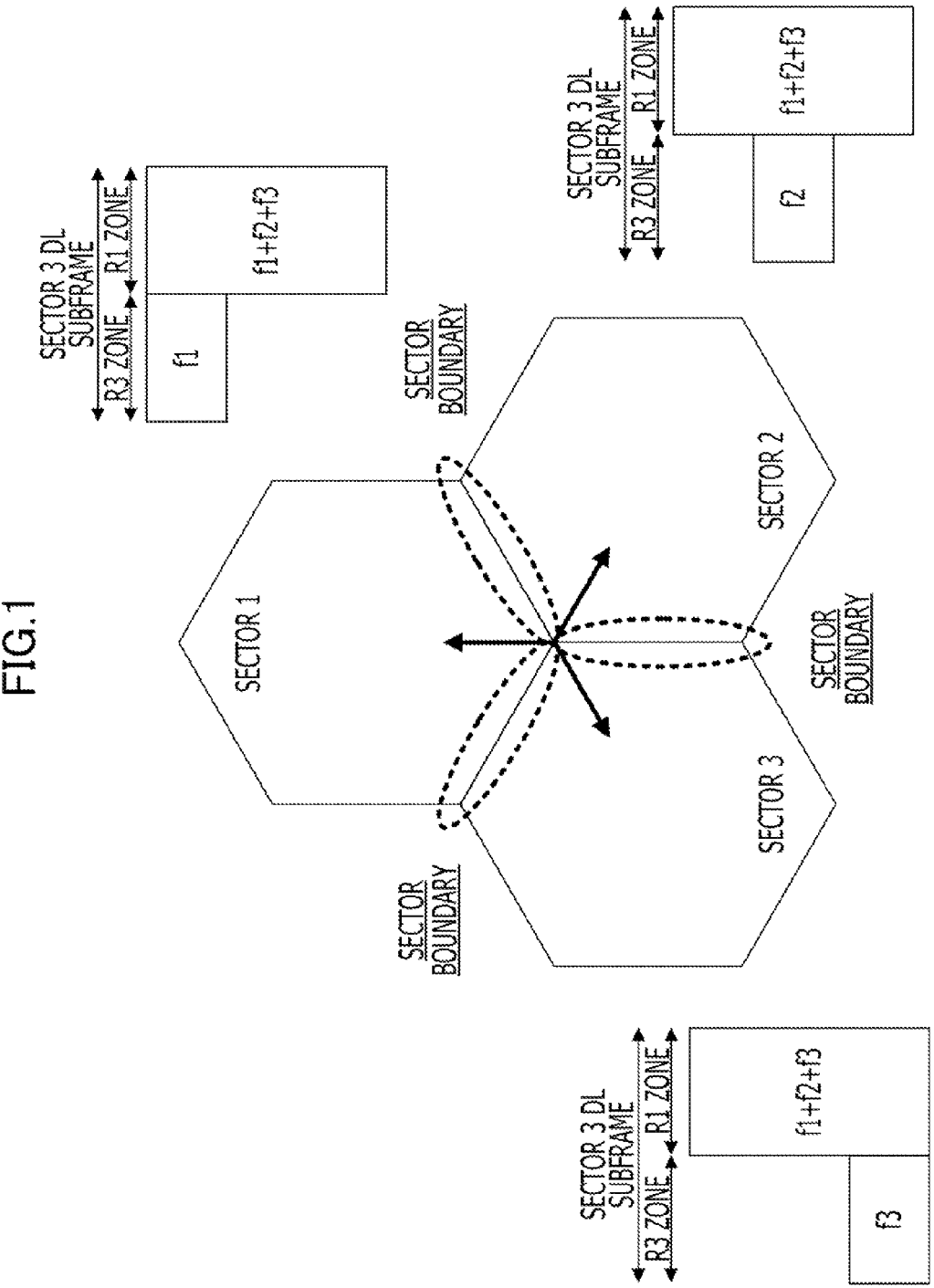
FIG. 1 is a diagram illustrating an example in which fractional frequency reuse (FFR) is applied to a network with a three-sector configuration.

Referring to FIG. 1, an example in which fractional frequency reuse (FFR) is applied to a network with a three-sector configuration will be described as an example of application of this technology. A base station (not shown) is present in the position at which three sectors 1 to 3 are adjacent to one another in FIG. 1. The base station has antennas each with a directivity indicated by the arrow for the individual sectors and performs communication processes, such as transmission and reception of data and measurement of radio quality, for each antenna. The base station allocates the data of mobile stations present in the sectors to a frequency domain common to adjacent sectors or a frequency domain different from those of the adjacent sectors based on the radio qualities, transmission power, etc., of the individual mobile stations.

FIG. 1 illustrates an example of downlink subframes (from a radio base station to mobile stations) of an orthogonal frequency division multiple access (OFDMA) radio frame when FFR is applied. FIG. 1 illustrates only the downlink subframes and omits uplink subframes (from the mobile stations to the radio base station) for simplicity. FIG. 1 also omits a frame control header (FCH), a DL-MAP, and other control information regions. In FIG. 1, the horizontal axis represents a time direction in units of symbol, and the vertical axis represents a frequency direction in units of subchannel.

The DL subframes each includes an R3 zone to which a frequency domain f1, f2, or f3 different from the adjacent sectors is allocated and an R1 zone to which frequency domains f1+f2+f3 common to the adjacent sectors are allocated.

The antennas of the sectors individually transmit and receive independent preambles and frames. The frames of the sectors each include the R1 zone and the R3 zone. For the R3 zone, a different frequency domain is set so as not to overlap among the sectors, and for the R1 zone, a frequency domain common to all the sectors is set. Although the UL subframe is not shown in FIG. 1, the UL subframe may have the same configuration as the DL subframe or have only the R3 zone.

Frame Configuration

Figure 2:
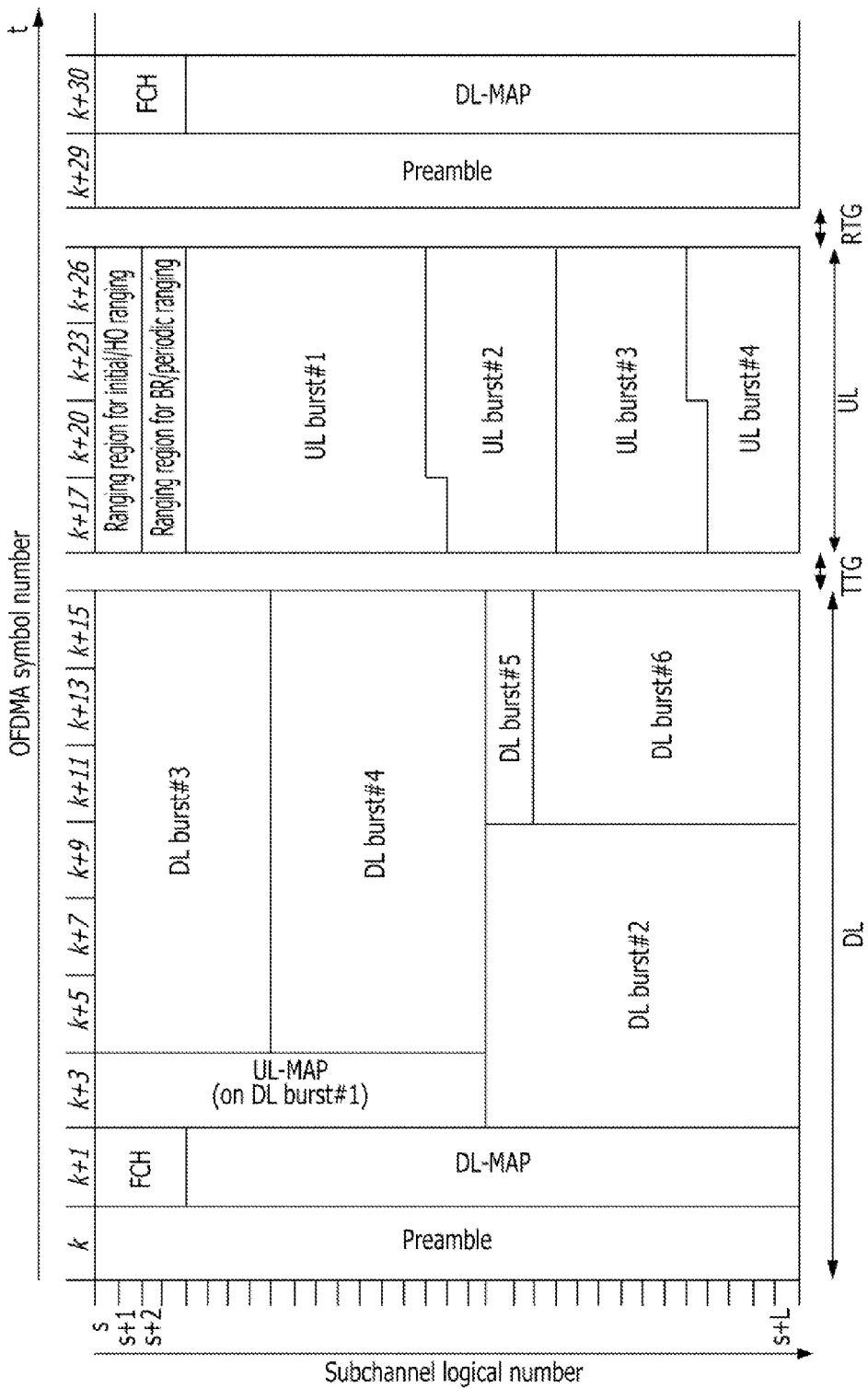
FIG. 2 is a schematic diagram of an example of an orthogonal frequency division multiple access (OFDMA) radio frame.

FIG. 2 illustrates a schematic diagram of an example of an OFDMA radio frame in the worldwide interoperability for microwave access (WiMAX). In the diagram, the horizontal axis represents OFDMA symbol numbers and the vertical axis represents subchannel logical numbers.

The OFDMA frame includes a downlink subframe, an uplink subframe, a transmit/receive transition gap (TTG), and a receive/transmit transition gap (RTG).

The DL subframe includes a preamble, a frame control header (FCH), a DL-MAP, a UL-MAP, and a plurality of DL bursts. The preamble includes a preamble pattern necessary for the mobile station to achieve frame synchronization. The FCH includes information about the subchannel used and the DL-MAP located just behind. The DL-MAP includes mapping information on the DL bursts of the DL subframe. The mobile station may identify the UL-MAP (transmitted by a DL burst #1) and DL bursts (#2 to #6) by receiving and analyzing the mapping information.

The UL-MAP includes mapping information on the ranging regions and the UL bursts of the UL subframe. The mobile station may identify the ranging regions and the UL bursts (#1 to #4) by analyzing the mapping information.

The term "burst" refers to the allocation and arrangement of slots in a downlink subframe and an uplink subframe of a radio frame for downlink user data and control messages transmitted to a mobile station and for uplink user data and control messages transmitted from the mobile station. The same modulation scheme and forward error correction (FEC) combination is used for a burst. The DL-MAP and the UL-MAP specify a particular combination of a modulation scheme and FEC for each burst. The result of scheduling by the radio base station is notified to all the mobile stations using the DL-MAP and the UL-MAP attached to the head of the DL subframe in each frame.

The DL of the OFDMA frame in FIG. 2 corresponds to the DL subframe of each sector in FIG. 1.

Configuration of Base Station of First Embodiment

Figure 3:
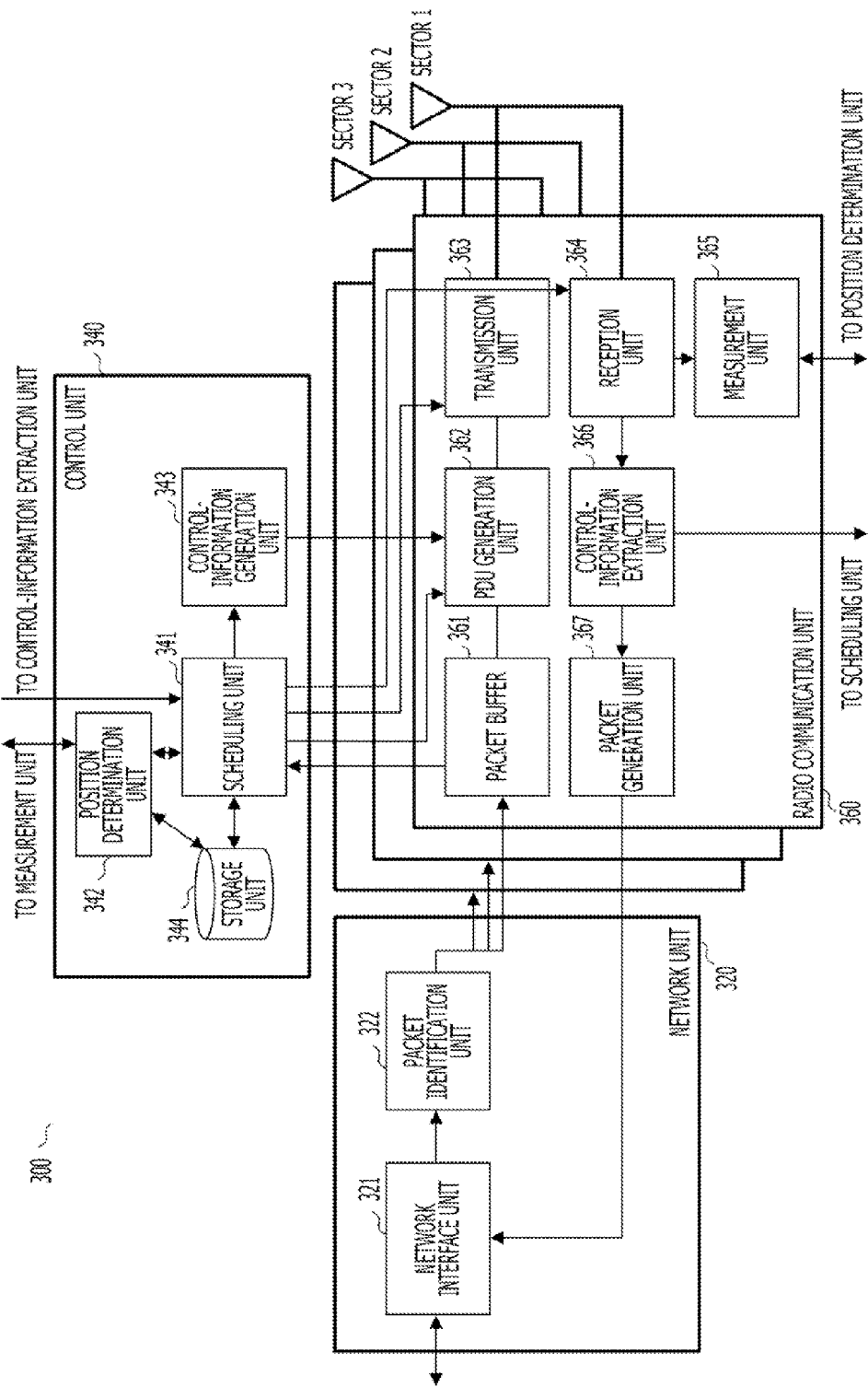
FIG. 3 is a block diagram of a base station according to a first embodiment.

FIG. 3 is a block diagram of a base station 300 according to a first embodiment. The base station 300 includes a network unit 320 and a control unit 340 common to a plurality of sectors and radio communication units 360 provided for the individual sectors.

The network unit 320 includes a network interface unit 321 and a packet identification unit 322. The network interface unit 321 transmits and receives packets between a main network and the radio communication unit 360. The packet identification unit 322 transmits packets sent from the network to a packet buffer 361 of the radio communication unit 360 of an appropriate sector.

The control unit 340 includes a scheduling unit 341, a position determination unit 342, a control-information generation unit 343, and a storage unit 344. The scheduling unit 341 performs scheduling, such as allocating frequency domains for use in downlink and uplink to the mobile station based on control information and reception quality of the mobile station received via the radio communication unit 360. The scheduling unit 341 performs unified scheduling of the plurality of sectors controlled by the base station 300.

The position determination unit 342 determines whether the mobile station is present at the boundary of the sectors or whether the mobile station is present in the vicinity of the base station 300 based on the reception quality of the mobile station received from the radio communication units 360 of the sectors.

The control-information generation unit 343 generates control information to be transmitted to the mobile station based on the control of the scheduling unit 341 and transmits the information to the radio communication unit 360.

The storage unit 344 stores system information and connection information and positional information on mobile stations, FFR zone information, modulation and coding scheme (MCS) information, etc. The information stored in the storage unit 344 is used for scheduling by the scheduling unit 341.

The radio communication unit 360 of each sector includes a packet buffer 361, a PDU generation unit 362, a transmission unit 363, a reception unit 364, a measurement unit 365, a control-information extraction unit 366, and a packet generation unit 367. The radio communication unit 360 of each sector performs transmission and reception to/from a coupled mobile station based on the result of scheduling by the scheduling unit 341.

The packet buffer 361 stores packets sent from the network unit 320. The packet buffer 361 notifies the scheduling unit 341 of a packet residence state.

The PDU generation unit 362 converts the packet stored in the packet buffer 361 to a protocol data unit (PDU) for radio transmission. The PDU generation unit 362 also converts control information generated by the control-information generation unit 343 of the control unit 340 to PDU.

The transmission unit 363 encodes and modulates the data generated by the PDU generation unit 362 to generate a radio signal. The PDU generation unit 362 and the transmission unit 363 perform the processes under the control of the scheduling unit 341 of the control unit 340.

The reception unit 364 receives a radio signal from a mobile station, demodulates and decodes it, and passes the data to the control-information extraction unit 366.

The measurement unit 365 measures the radio quality and reception power of the radio signal that the reception unit 364 has received from the mobile station. These processes are also performed under the control of the scheduling unit 341 of the control unit 340.

If the data received from the mobile station includes control information, the control-information extraction unit 366 notifies the control information to the scheduling unit 341. The control-information extraction unit 366 relays data to the network to the packet generation unit 367.

The packet generation unit 367 generates a packet to be transmitted to the network from the data received from the control-information extraction unit 366. The generated packet is transmitted to the network via the network interface unit 321.

Data in Storage Unit

FIG. 4 illustrates an example of data stored in the storage unit 344. The storage unit 344 stores sector numbers for identifying sectors that the base station 300 controls, the IDs of mobile stations present in the individual sectors, zones selected for the mobile stations, adjacent sector numbers that are the numbers of sectors adjacent to a sector in which the mobile station is present, and the numbers of subchannels that the individual mobile stations need.

The zone indicates the FFR zone, in other words, an R1 zone or an R3 zone. The FFR zone is selected by the position determination unit 342 of the base station based on a preamble SINR fed back from the mobile station. The adjacent sector number represents a sector adjacent to a sector in which the mobile station is present.

The scheduling unit 341 of the base station 300 instructs the measurement units 365 of the individual sectors to measure the reception qualities of the radio signals from the mobile stations, determines an adjacent sector number for each mobile station based on the measurements and the transmission power values of the mobile stations, and stores the adjacent sector numbers in the storage unit 344.

Selection of Zone

Figure 5:
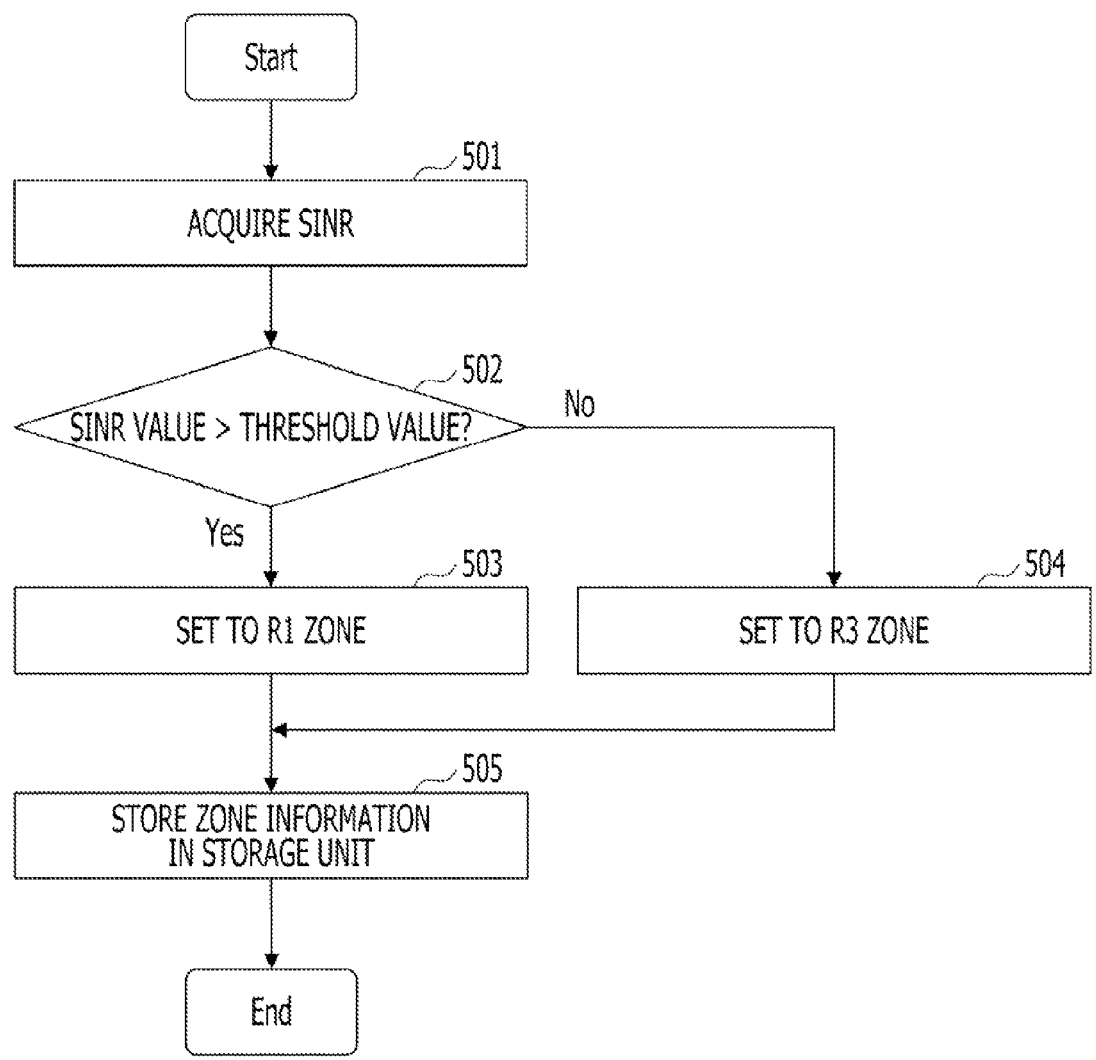
FIG. 5 is a diagram of an example of the flow of selecting an FFR zone by the base station.

FIG. 5 illustrates an example of the flow of selecting an FFR zone by the base station 300. In step 501, the base station 300 acquires the value of preamble SINR from a mobile station. In step 502, the base station 300 determines whether the value of the preamble SINR is greater than a predetermined threshold value of the SINR. If the value of the preamble SINR is greater than the threshold value, then the scheduling unit 341 of the base station 300 selects the R1 zone for the mobile station in step 503. If the value of the preamble SINR is smaller than the threshold value, then the scheduling unit 341 selects the R3 zone for the mobile station in step 504. In step 505, the scheduling unit 341 stores the result of selection, in other words, the R1 zone or the R3 zone in the zone of the storage unit 344 (FIG. 4).

Figure 6:
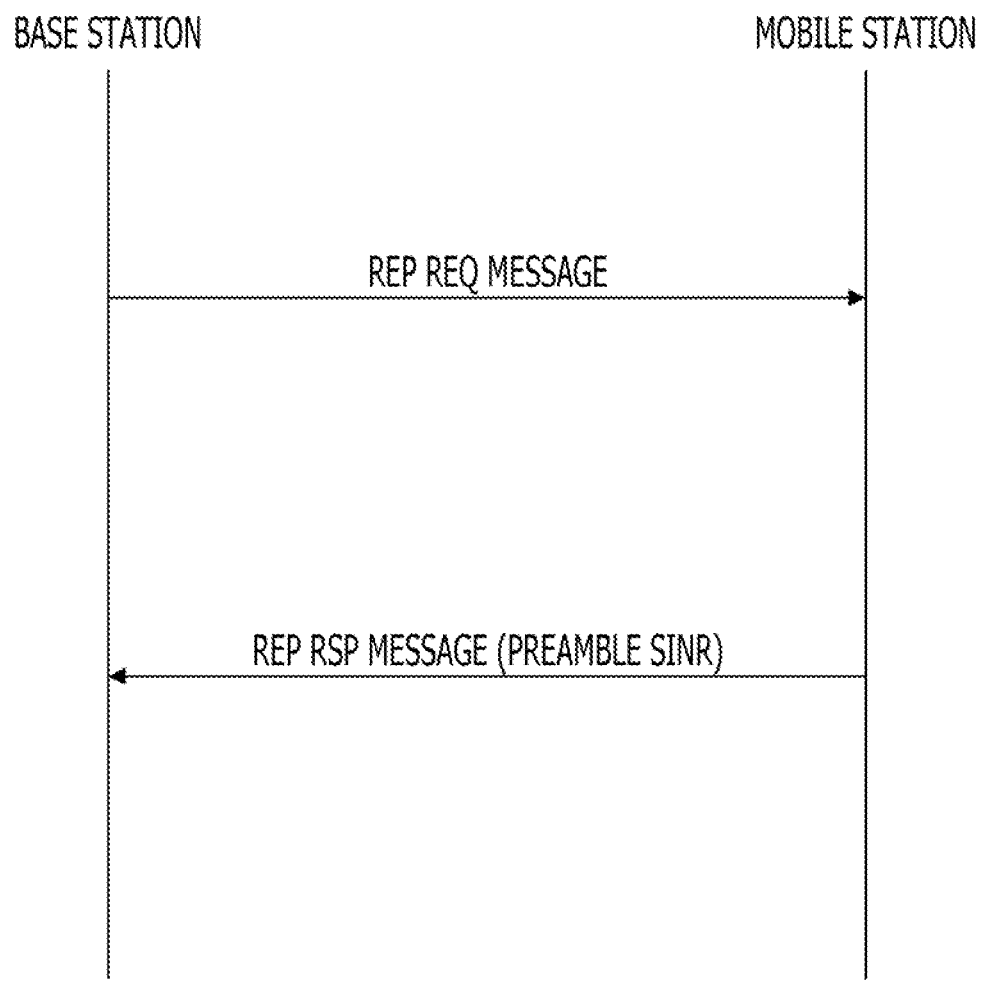
FIG. 6 is a diagram of an example of the flow of the base station for acquiring a preamble SINR from a mobile station.

The preamble SINR is acquired in accordance with an example of the flow of acquiring the value of the preamble SINR from a mobile station by the base station 300 shown in FIG. 6. The base station 300 transmits a report request (REP REQ) message to a target mobile station. The base station 300 instructs the mobile station to feed back a preamble SINR using this message. The mobile station that has received the REP REQ message inputs a preamble SINR into a report response (REP RSP) message and feeds back the preamble SINR to the base station 300.

Determination of Adjacent Sector and Position of Mobile Station

An example in which the position determination unit 342 of the base station 300 uses an uplink SINR as reception quality for use in determining the position of a mobile station will be described.

The position determination unit 342 of the base station 300 determines an adjacent sector that is a sector adjacent to a sector in which the mobile station is present based on the SINR values measured by the measurement units 365 of the individual sectors and determines the position of the mobile station based on the transmission power.

Figure 7:
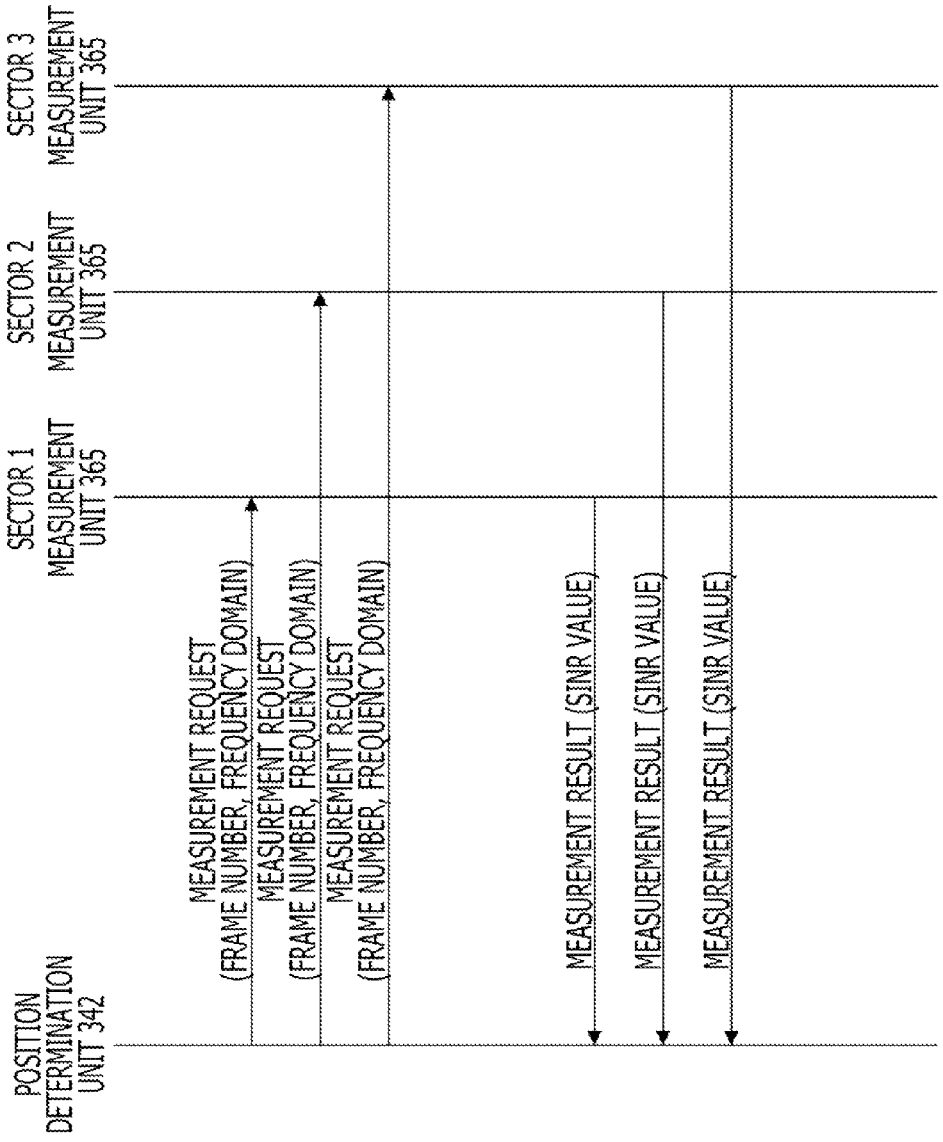
FIG. 7 is a diagram of an example of the flow of a position determination unit for acquiring SINR values from mobile stations from the measurement units of individual sectors.

FIG. 7 illustrates an example of the flow of the position determination unit 342 of the base station 300 for acquiring the SINR values of signals transmitted from mobile stations from the measurement units 360 of the sectors. The process in FIG. 7 is executed for the mobile stations for which the R3 zone is selected in FIG. 5.

The scheduling unit 341 of the base station 300 allocates a frequency domain to each mobile station by scheduling. The position determination unit 342 transmits a measurement request to measure the transmission signals from the mobile stations to the measurement units 365 of the individual sectors. The measurement request includes a frame number and a frequency domain to be measured.

The measurement unit 365 measures the frequency domains of the designated frames and returns the SINR values to the position determination unit 342 as the result of measurement.

Figure 8:
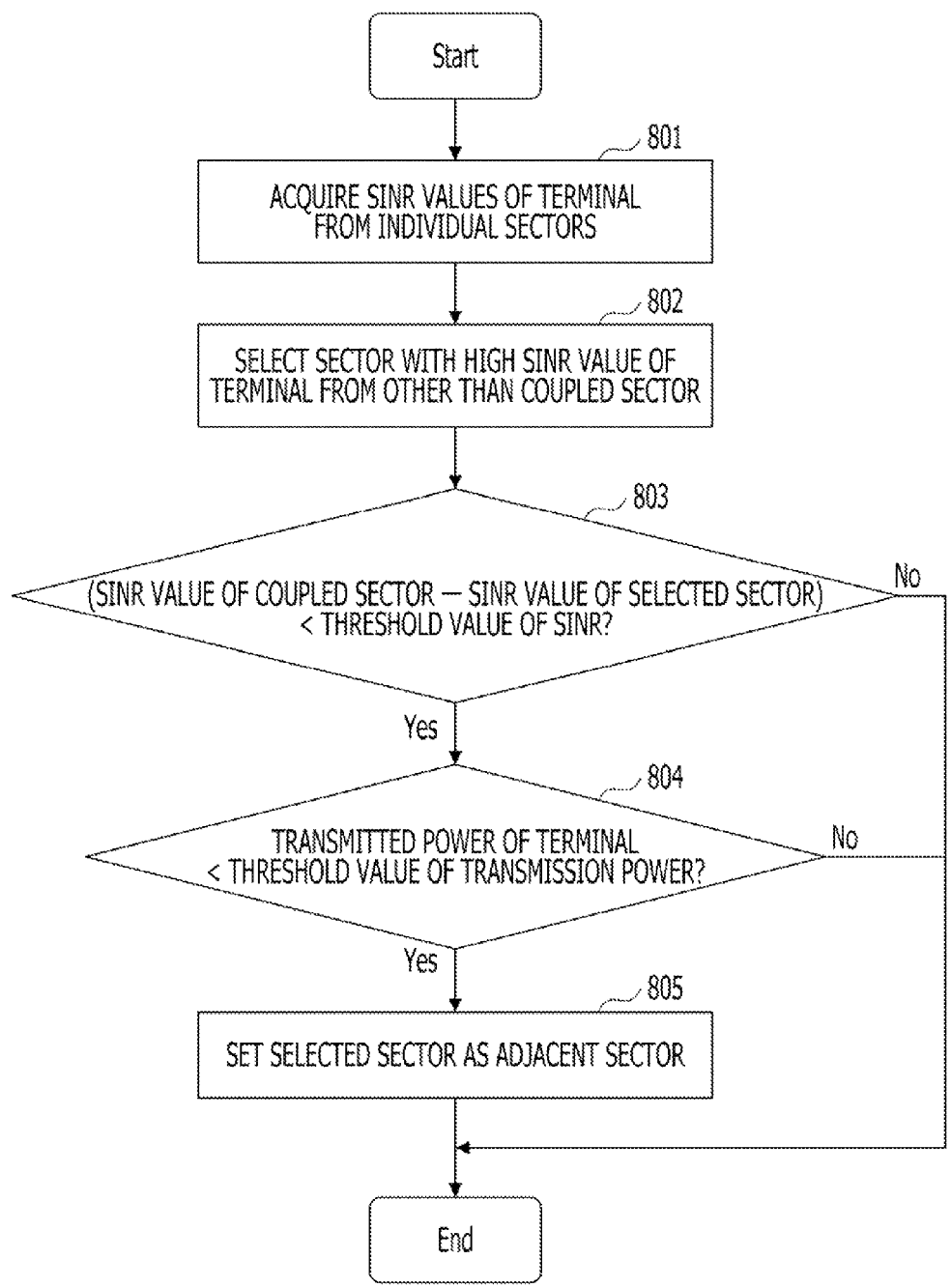
FIG. 8 is a diagram of an example of the flow of the position determination unit for determining the adjacent sector of the mobile station based on the reception qualities (SINR values) acquired from the measurement units.

FIG. 8 illustrates an example of the flow of the position determination unit 342 for determining the adjacent sector of the mobile station based on the reception qualities (SINR values) acquired from the measurement units 365 in accordance with the flow in FIG. 7.

In step 801, the position determination unit 342 of the base station 300 acquires SINR values from the measurement units 365 of the individual sectors in accordance with the flow in FIG. 7.

In step 802, the position determination unit 342 of the base station 300 compares the SINR values of the mobile stations acquired by the measurement units 365 of sectors other than the sector to which the mobile station is coupled to and selects the highest SINR value.

In step 803, the position determination unit 342 calculates the difference between the SINR value of the mobile station in the sector to which the mobile station is coupled to and the SINR value selected in step 802. If the difference in the SINR value is smaller than the preset threshold values of the SINR value, the flow moves to step 804. If the difference in the SINR value is greater than the preset threshold value of the SINR value, the flow ends.

The preset threshold value of the SINR value is used to determine whether the mobile station is present at the sector boundary. The smaller the difference in the distance between the mobile station and the measurement units 365 of the individual sectors, the smaller the difference in the SINR value. Accordingly, if the difference in the SINR value is smaller than a certain threshold value, the mobile station may be assumed to be present at a sector boundary equally away from the measurement units 365 of two sectors. For example, if an SINR value that the measurement unit 365 (FIG. 3) of the sector 1 (FIG. 1) acquires from a certain mobile station and an SINR value that the measurement unit 365 of the sector 2 acquires from the certain mobile station are substantially equal and the difference therebetween is smaller than a certain threshold value, the mobile station may be assumed to be present at the boundary between the sector 1 and the sector 2 in FIG. 1.

The larger the difference in distance between the mobile station and the measurement units 365 of the individual sectors, the larger the difference in the SINR value. Accordingly, if the difference in the SINR value is greater than a certain threshold, the mobile station may be assumed to be present inside the sector from which the distances to the measurement units 365 of the two sectors significantly differ and away from the sector boundary. For example, if the SINR value that the measurement unit 365 (FIG. 3) of the sector 1 (FIG. 1) acquires from a certain mobile station and the SINR value that the measurement unit 365 of the sector 2 acquires from the certain mobile station significantly differ and the difference therebetween is larger than a certain threshold, the mobile station may be assumed to be present inside the sector 1 or inside the sector 2 away from the sector boundary in FIG. 1.

In step 804, the position determination unit 342 refers to the transmission power of the mobile station. If the transmission power of the mobile station is smaller than a preset threshold value of the transmission power, the flow moves to step 805. If the transmission power is greater than the preset transmission power, the flow ends.

The preset threshold value of the transmission power is used to estimate the difference between the base station and the mobile station to determine whether the mobile station is present in the vicinity of the base station. The shorter the distance between the mobile station and the measurement unit 365 of the sector, the smaller the transmission power of the mobile station. Accordingly, if the transmission power is smaller than a certain threshold value, the distance between the mobile station and the base station may be assumed to be shorter than a distance corresponding to the threshold value. The estimation on the distance between the mobile station and the base station may also use reception power measured in the mobile station. If the reception power is higher than a certain threshold value, the distance between the mobile station and the base station may be determined to be short.

In step 805, the position determination unit 342 stores a sector corresponding to the SINR value selected in step 802 as an adjacent sector in the storage unit 344. The position determination unit 342 may notify the adjacent sector to the scheduling unit 341.

In the process of FIG. 8, the position determination unit 342 determines whether the mobile station is located at the sector boundary by comparing the SINR value of the sector coupled to the mobile station with the SINR values of the sectors. The position determination unit 342 further determines whether the mobile station is present in the vicinity of the base station from the transmission power of the mobile station. The adjacent sector set in the process of FIG. 8 is stored as the adjacent sector number in FIG. 4.

Scheduling Process for Each Sector

Next, referring to FIGS. 9 and 4, the scheduling process of the scheduling unit 341 for allocating the data and resources of the mobile station to the individual sectors will be described. The data allocation is a downlink process, and the resource allocation is an uplink process. Although the data allocation process will be described hereinbelow, the resource allocation is similar thereto.

Figure 9:
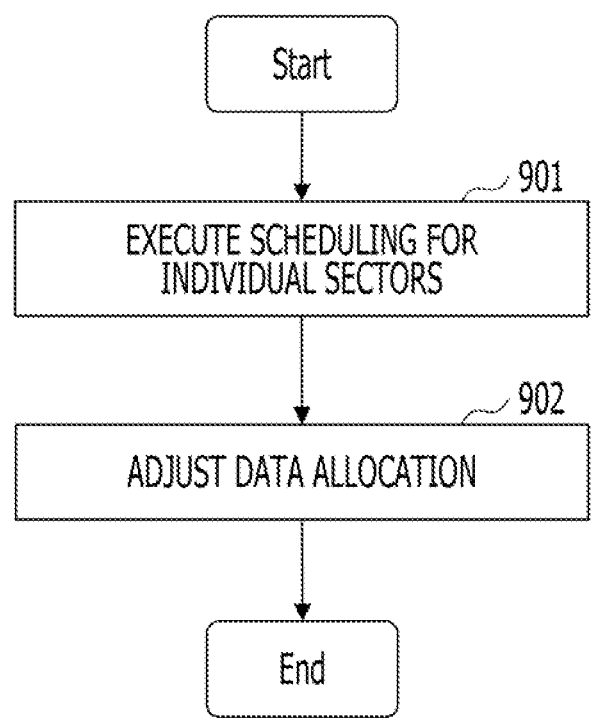
FIG. 9 is a diagram of an example of the flow of a scheduling process by a scheduling unit.

FIG. 9 illustrates the flow of the scheduling process by the scheduling unit 341.

In step 901, the scheduling unit 341 executes the scheduling process for each sector.

In step 902, the scheduling unit 341 adjusts the data allocation on the individual sectors based on the result of step 901.

The data allocation is adjusted with reference to the table in FIG. 4 and the R3-zone allocation state at that time. As described later, the data allocation is not adjusted for sectors in which no packet remains in the packet buffer 361.

Shifting of Frequency Domain

Figure 10:
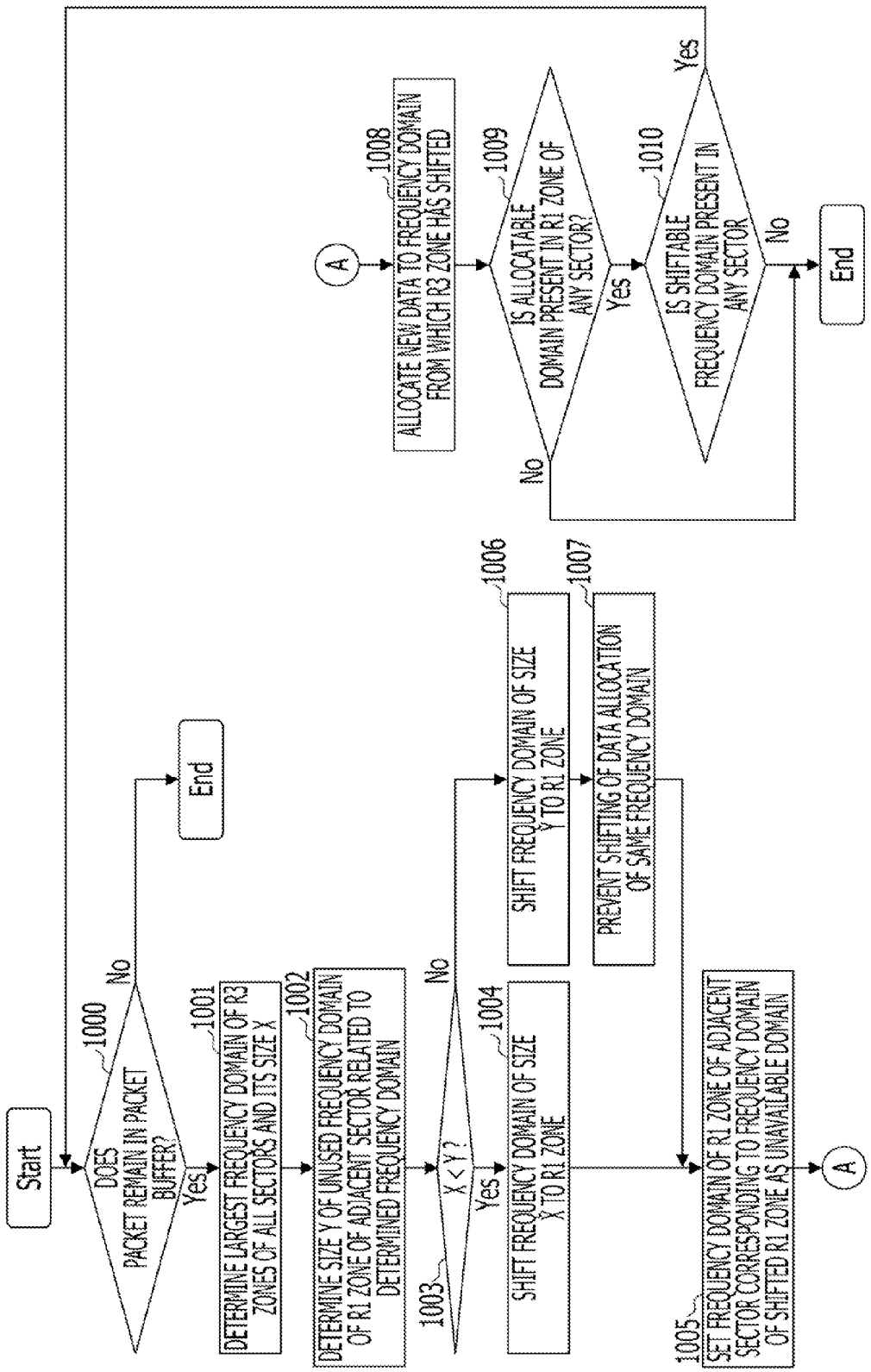
FIG. 10 is a diagram of an example of the flow of adjustment of data allocation in the scheduling process by the scheduling unit.

The adjustment of data allocation in step 902 of FIG. 9 is illustrated in detail in FIG. 10. FIG. 10 illustrates the flow of adjustment of data allocation in the scheduling process by the scheduling unit 341.

In step 1000, the scheduling unit 341 determines for each sector whether a packet stays in the packet buffer 361 as a result of the scheduling in step 901. If a packet stays, in other words, if a packet remains, the process moves to step 1001. If no packet remains in the packet buffers 365 of any sectors, the process ends.

In step 1001, the scheduling unit 341 determines a frequency domain to be shifted to the R1 zone from among the frequency domains allocated to the R3 zones of all the sectors after the scheduling of the sectors in step 901 of FIG. 9. The shift is performed on the mobile stations in which the R3 zone is selected and adjacent sector number is set on the table in FIG. 4, in other words, frequency domains allocated to the mobile stations present at the sector boundary in FIG. 1.

For example, mobile stations for which the R3 zone is selected on the table in FIG. 4 are mobile stations 1b to 1d (row number: 2 to 4), mobile stations 2b and 2c (row number: 7 and 8), and mobile stations 3a to 3c (row number: 10 to 12). Among them, mobile stations present at the sector boundary are mobile stations 1b and 1c (row number: 2 and 3), a mobile station 2c (row number: 8), and mobile stations 3a and 3b (row number: 10 and 11), to which adjacent sector number: 2, 3, 8, 10, or 11 is set. Among them, a mobile station that uses the largest frequency domain is a mobile station 1b (row number: 2) to which the largest number of subchannels are allocated. Accordingly, in the example of FIG. 4, the frequency domain allocated to the mobile station 1b is determined as the largest frequency domain of size X.

In step 1002, the scheduling unit 341 determines the size Y of the unused frequency domain of the R1 zone of the adjacent sector corresponding to the largest frequency domain determined in step 1001.

In step 1003, the scheduling unit 341 compares the size X determined in step 1001 and the size Y determined in step 1002. If the size X is smaller than the size Y, the process moves to step 1004.

In step 1004, the scheduling unit 341 shifts the largest frequency domain of the size X determined in step 1001 to the R1 zone. Thus, the frequency domain of the R1 zone that is not affected by interference from the adjacent sector may be effectively used.

In step 1005, the scheduling unit 341 sets the frequency domain of the R1 zone of the adjacent sector corresponding to the frequency domain in the R1 zone shifted in step 1004 to an unavailable domain. For the adjacent sector, no new data allocation is performed on the unavailable domain. This may avoid interference to the shifted frequency domain from the adjacent sector caused by new allocation of a frequency domain executed in the adjacent sector.

If the size X is larger than the size Y in step 1003, the process moves to step 1006. In step 1006, the scheduling unit 341 shifts only a frequency domain of size Y out of the frequency domains of size X to the R1 zone. Thus, the frequency domain of the R1 zone that is not affected by interference from the adjacent sector may be effectively used.

In step 1007, the scheduling unit 341 prevents the frequency domain in the R3 zone shifted in step 1006 from being shifted to the R1 zone again. For example, the scheduling unit 341 may prevent the selected mobile station from being selected again in the next step 1001 by deleting the adjacent sector number of the selected mobile station on the table in FIG. 4.

In step 1008, the scheduling unit 341 allocates new data to the frequency domain in the R3 zone that has become a free space due to the shift in step 1004 or 1006. This allows the frequency domain in the R3 zone to be used effectively.

In step 1009, the scheduling unit 341 determines whether an allocatable, in other words, unused frequency domain is present in the R1 zone of any of the sectors. If an unused frequency domain is present, the process moves to step 1010. If no unused frequency domain is present, the process ends.

In step 1010, the scheduling unit 341 determines whether a shiftable frequency domain is present in any of the sectors. If a shiftable frequency domain is present, the process returns to step 1000, and the scheduling unit 341 shifts the frequency domain from the R3 zone to the R1 zone. If no shiftable frequency domain is present, the process ends.

Example of Shifting of Frequency Domain

Figure 11:
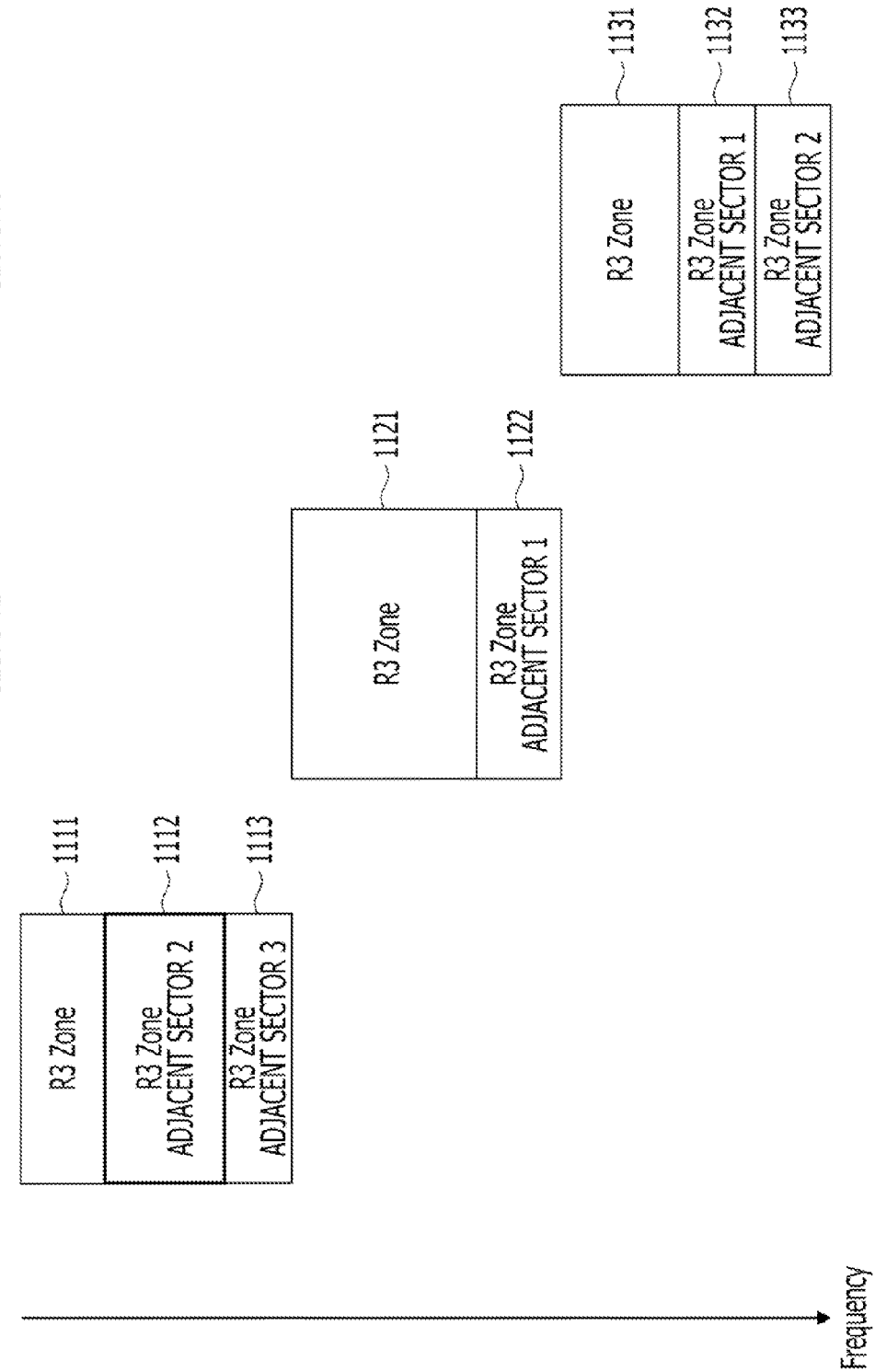
FIG. 11 is a diagram illustrating shifting of the frequency domains of R3 zones according to the flow in FIG. 10.
Figure 12:
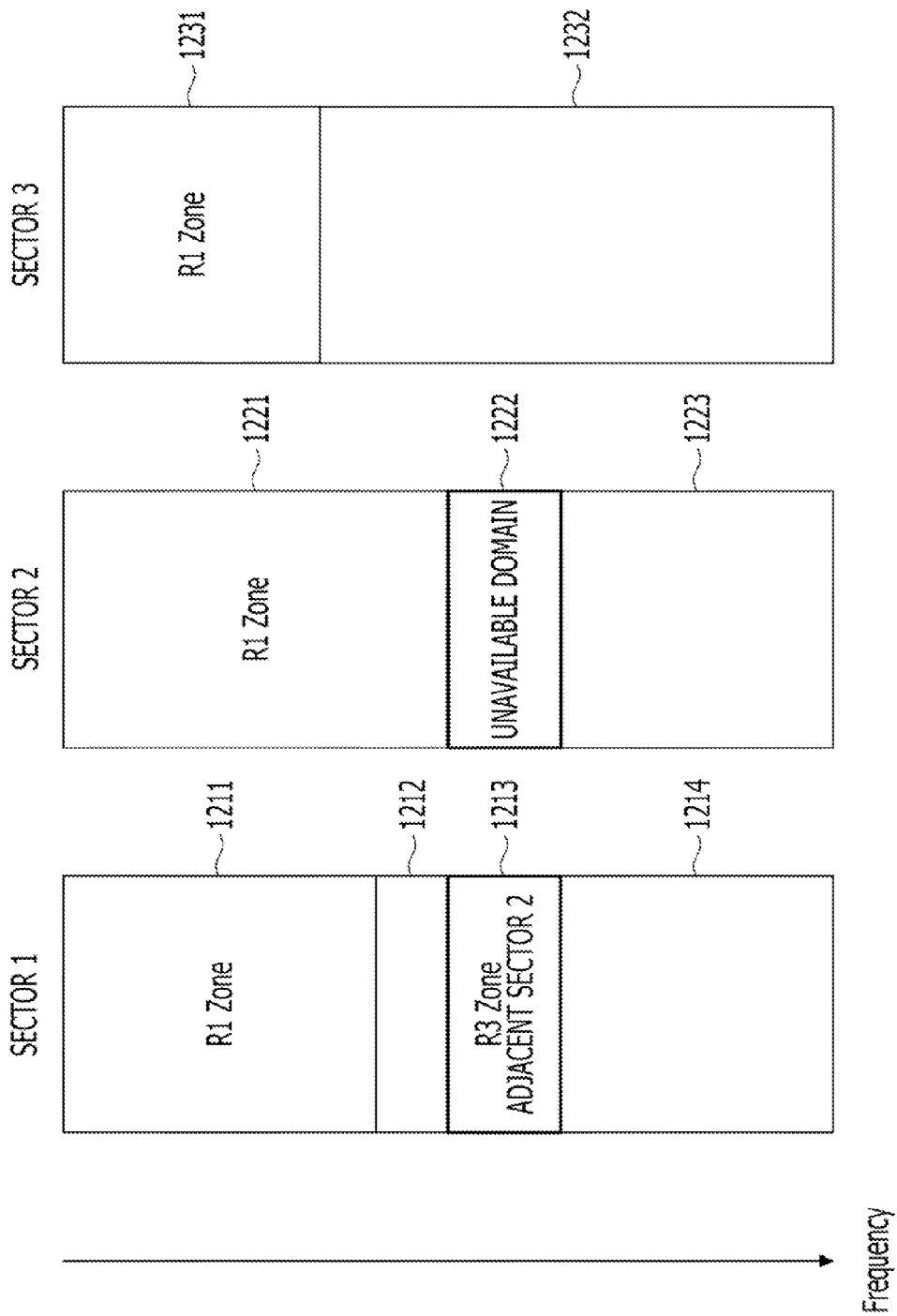
FIG. 12 is a diagram illustrating shifting of the frequency domains of R1 zones according to the flow in FIG. 10.

Referring to FIGS. 11 and 12, shifting of the frequency domains of the R3 zone and the R1 zone according to the flow of FIG. 10 will be described. FIGS. 11 and 12 illustrate the allocation states of the frequency domains of the R3 and R1 zones that the sectors 1, 2, and 3 use, respectively. The vertical axes in FIGS. 11 and 12 represent a frequency direction in the units of subchannel. The size of the frequency domain along the vertical axis corresponds to the number of subchannels on the table in FIG. 4.

FIG. 11 illustrate an example of the allocation states of the frequency domains of the R3 zones of the individual sectors as a result of the scheduling process for the individual sectors in step 901 of FIG. 9. As shown in FIG. 11, the R3 zone in the sector 1 is allocated three frequency domains 1111 to 1113. The frequency domains correspond to row numbers 4, 2, and 3 in FIG. 4, respectively. Likewise, the frequency domains 1121 and 1122 in the sector 2 correspond to row numbers 7 and 8 in FIG. 4, respectively, and the frequency domains 1131 to 1133 in the sector 3 correspond to row numbers 12, 11, and 10 in FIG. 4, respectively.

Here, a case in which step 902 in FIG. 9, in other words, the flow of FIG. 10, is executed on the sector 1 will be described. In step 1001 of FIG. 10, it is determined based on the number of subchannels on the table in FIG. 4 that the frequency domain 1112 is the largest frequency domain, and its size X is 6.

Referring next to FIG. 12, as a result of executing the scheduling process for each of the sectors according to step 901 in FIG. 9, the allocation states of the frequency domains in the R1 zones of the individual sectors become as shown in FIG. 12. At that time, frequency domains 1213 and 1222 in FIG. 12 have not yet been allocated. In other words, the frequency domains 1212 to 1214, 1222, 1223, and 1232 are in an unused state.

A frequency domain 1211 in the R1 zone of the sector 1 in FIG. 12 corresponds to row number 1 in FIG. 4. A frequency domain 1221 of the sector 2 corresponds to row number 6, and a frequency domain 1231 in the sector 3 corresponds to row number 13.

In step 1002, the total size Y of the unused frequency domains 1222 and 1223 in the R1 zone of the sector 2 adjacent to the sector 1 is determined. For example, the size Y may be determined by subtracting the number of subchannels of the frequency domain 1221 from the total number of the subchannels of the R1 zone in the sector 2. Alternatively, the scheduling unit 341 or the storage unit 344 may store the sizes of the unused frequency domains of the individual sectors.

In step 1003, since the size X is smaller than the size Y in the example of FIG. 12, the process moves to step 1004.

In step 1004, the frequency domain 1112 in FIG. 11 is shifted to the frequency domain 1213 in FIG. 12. As a result, the frequency domain 1112 in FIG. 11 becomes a free space, in which new data is allocated as necessary in steps 1008 to 1010.

In step 1005, as shown in FIG. 12, the frequency domain 1222 in the adjacent sector 2 corresponding to the frequency domain 1213 in the sector 1 allocated by shifting is set as an unavailable domain. Thus, the frequency domain 1222 is not allocated new data. This may therefore prevent interference from the adjacent sector even if the R1 zone that uses the same frequency domain as that of the adjacent sector is allocated to the mobile station present in the sector region.

Configuration of Base Station of Second Embodiment

Figure 13:
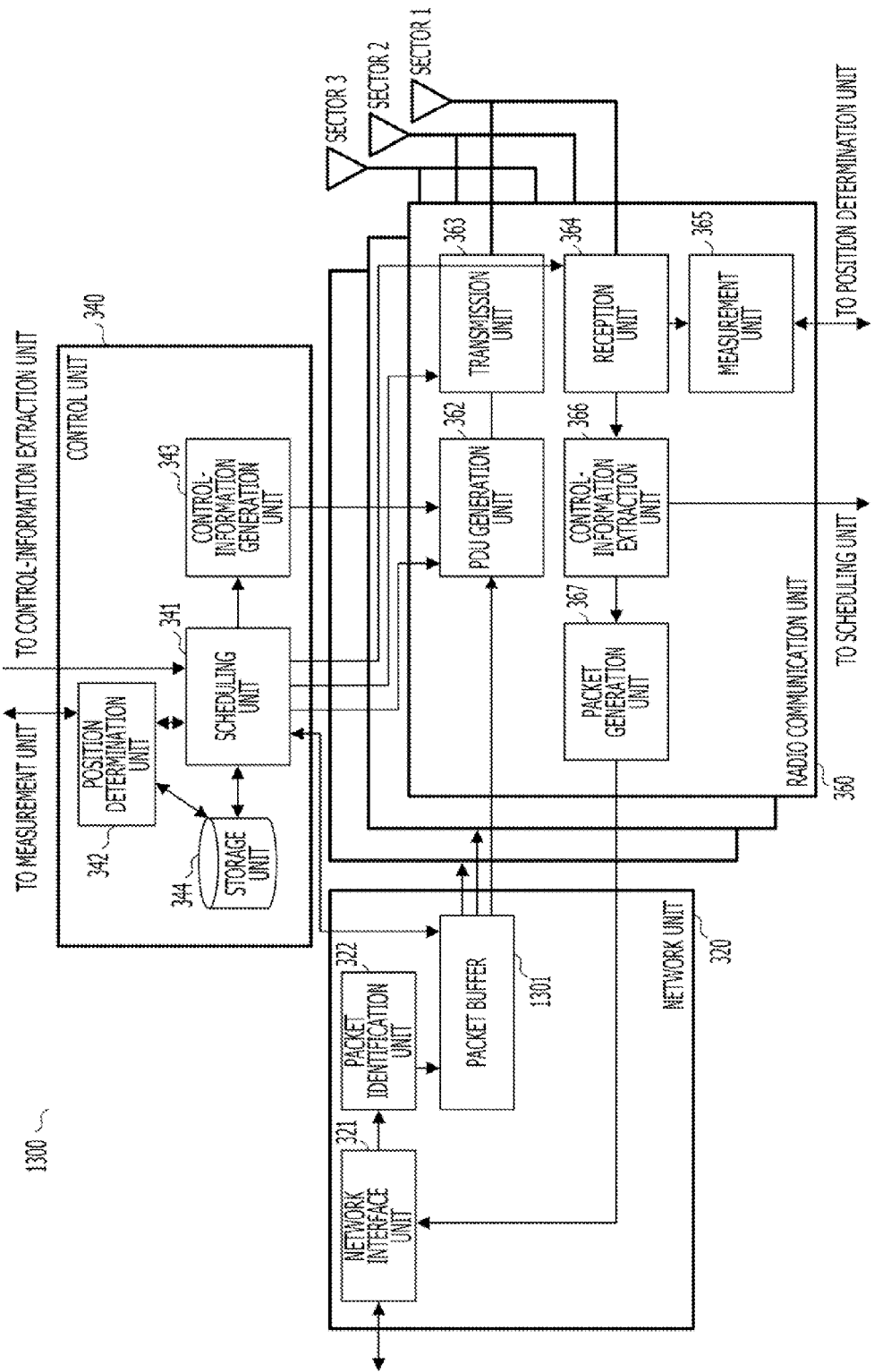
FIG. 13 is a block diagram of a base station according to a second embodiment.

Referring to FIG. 13, the configuration of a base station of a second embodiment will be described. A base station 1300 in FIG. 13 differs in the position of a packet buffer 1301 from the base station 300 in FIG. 3. In FIG. 13, the packet buffer 1301 is included in the network unit 320 and is shared by a plurality of sectors.

The PDU generation unit 362 of each sector acquires a packet from the packet buffer 1301 in accordance with an instruction from the scheduling unit 341 and generates data to be transmitted to a mobile station. The instruction from the scheduling unit 341 includes, for example, a frame number, data amount, and a mobile station ID corresponding to the data to be transmitted. The base station 1300 may generate the same data by the PDU generation units 362 of the plurality of sectors. In this case, the scheduling unit 341 instructs the plurality of PDU generation units 362 to generate the data based on the same packet.

Example of Shifting of Frequency Domain of Second Embodiment

Figure 14:
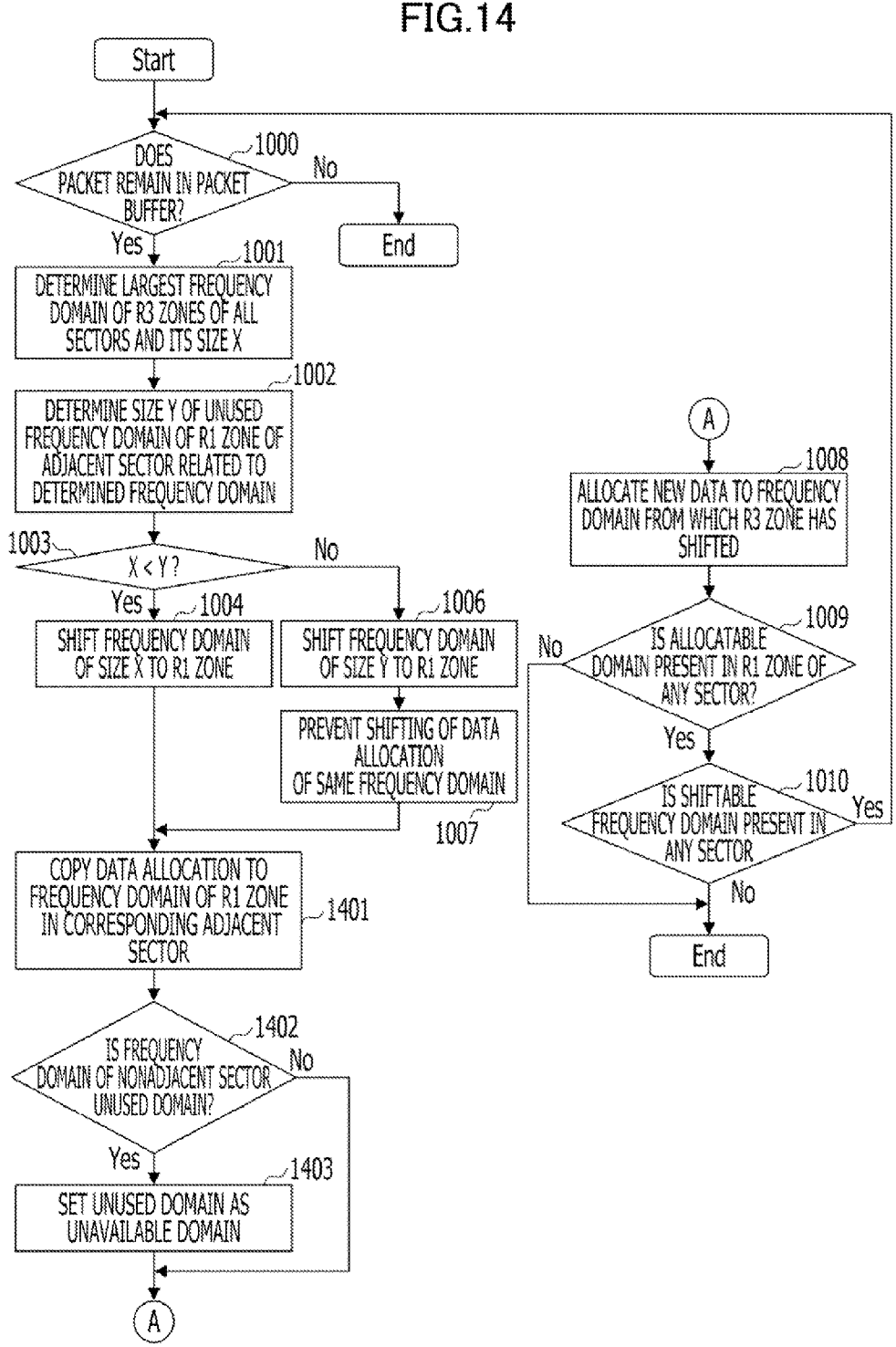
FIG. 14 is a diagram of an example of the flow of adjustment of data allocation in the scheduling process by the scheduling unit according to the second embodiment.
Figure 15:
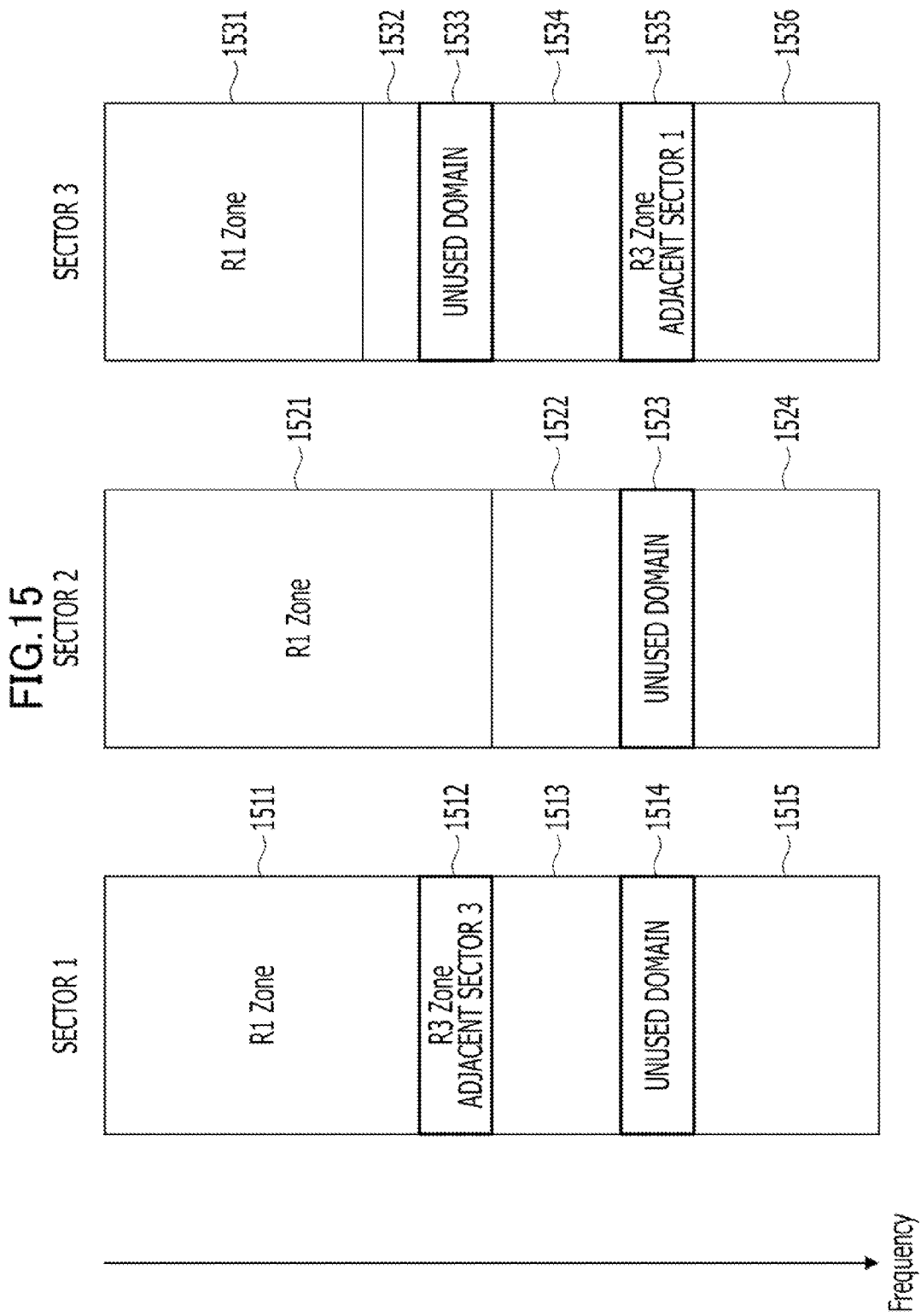
FIG. 15 is a diagram illustrating shifting of the frequency domains of R1 zones according to the second embodiment.
Figure 16:
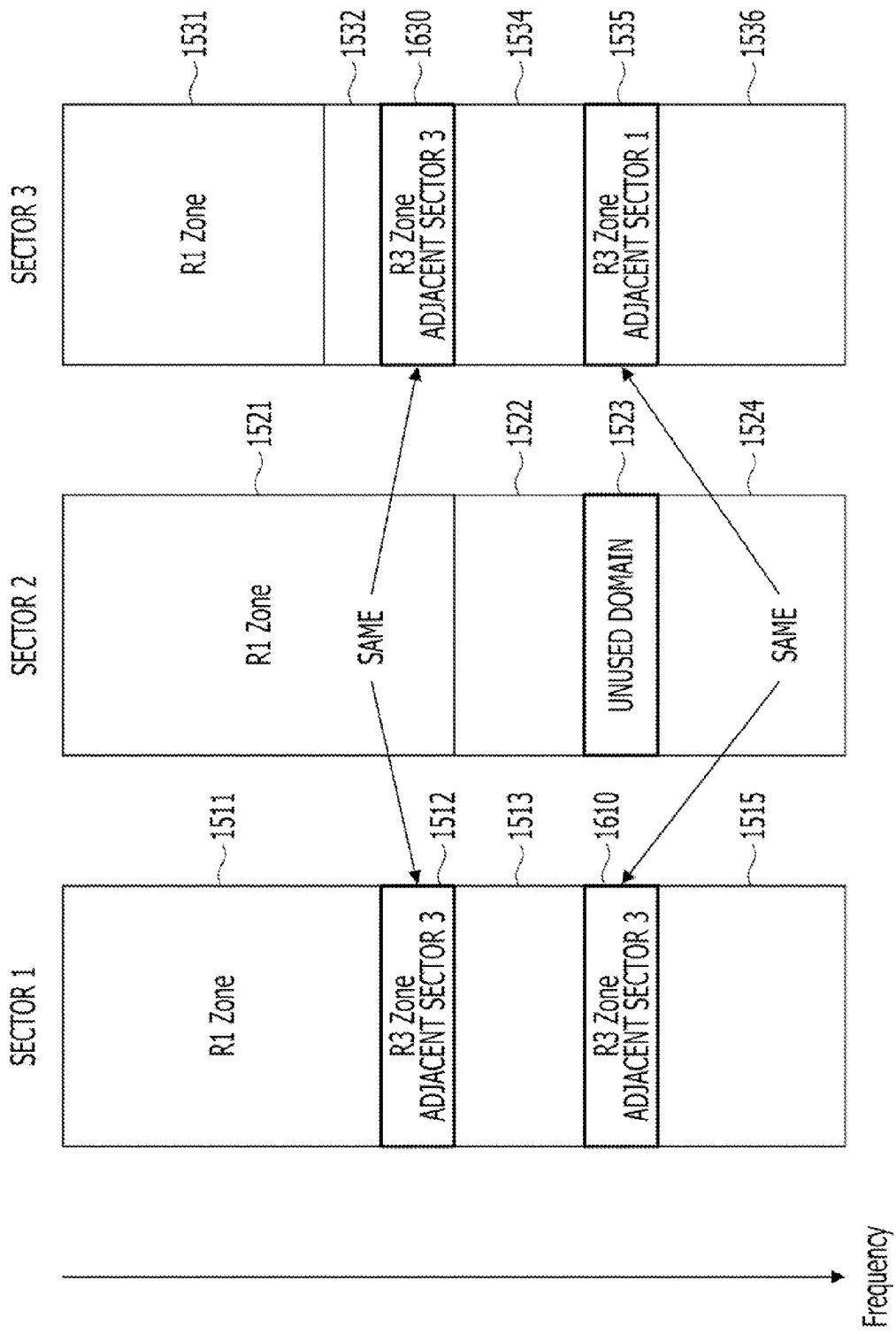
FIG. 16 is a diagram illustrating an example in which the same data is transmitted from a plurality of sectors according to the second embodiment.

Referring to FIGS. 14 to 16, shifting of frequency domains of the second embodiment will be described. In the second embodiment, a plurality of sectors transmit the same data at the same timing using the same frequency domain.

FIG. 14 illustrates adjustment of data allocation in step 902 of in FIG. 9 according to the second embodiment. The flowchart in FIG. 14 has steps 1401, 1402, and 1403 instead of step 1005 in FIG. 10.

In step 1401, the scheduling unit 341 in FIG. 13 copies data allocation shifted in step 1004 to the frequency domain in the R1 zone of the corresponding adjacent sector.

In step 1402, if the frequency domain of a nonadjacent sector is an unused domain, the scheduling unit 341 sets, in step 1403, the unused domain as an unavailable domain.

An example in which the data allocation of the R1 zone is performed as in FIG. 15 as a result of the process of steps 1000 to 1004 or the process of steps 1000 to 1003, 1006, and 1007 as in FIG. 10 will be described. The vertical axis in FIG. 15 represents a frequency direction in the units of subchannel. The size of the frequency domain along the vertical axis corresponds to the number of subchannels on the table in FIG. 4.

In FIG. 15, frequency domains 1511, 1521, and 1531 are allocated data. The frequency domain of the R3 zone is shifted to the frequency domain 1512 of the sector 1, and a frequency domain 1533 of the related sector 3 is set as an unused domain. The frequency domain of the R3 zone is shifted also to a frequency domain 1535 of the sector 3, and a frequency domain 1514 of the related sector 1 is set as an unused domain. Frequency domains 1513, 1515, 1522 to 1524, 1532, 1534, and 1536 are unused.

When step 1401 is executed here, frequency domains are allocated as in FIG. 16. FIG. 16 differs in frequency domains 1610 and 1630 from FIG. 15. The frequency domain 1533 in the sector 3, which was an unused domain in FIG. 15, is replaced with the frequency domain 1630 in FIG. 16. The PDU generation unit 362 of the sector 3 transmits the same data as that of the frequency domain 1512 using the frequency domain 1630.

Likewise, the frequency domain 1514 of the sector 1, which was an unused domain in FIG. 15, is replaced with the frequency domain 1610 in FIG. 16. The PDU generation unit 362 of the sector 1 transmits the same data as that of the frequency domain 1535 using the frequency domain 1610.

Thus, since the plurality of sectors transmit the same data to the same mobile station using the same frequency domain, the reception gain of the mobile station is increased.

Determination of Adjacent Sector and Position of Mobile Station in Third Embodiment In a third embodiment, the base station 300 acquires the reception qualities of the individual sectors measured by a mobile station and determines the adjacent sector of the mobile station and the position thereof based on the reception qualities.

Figure 17:
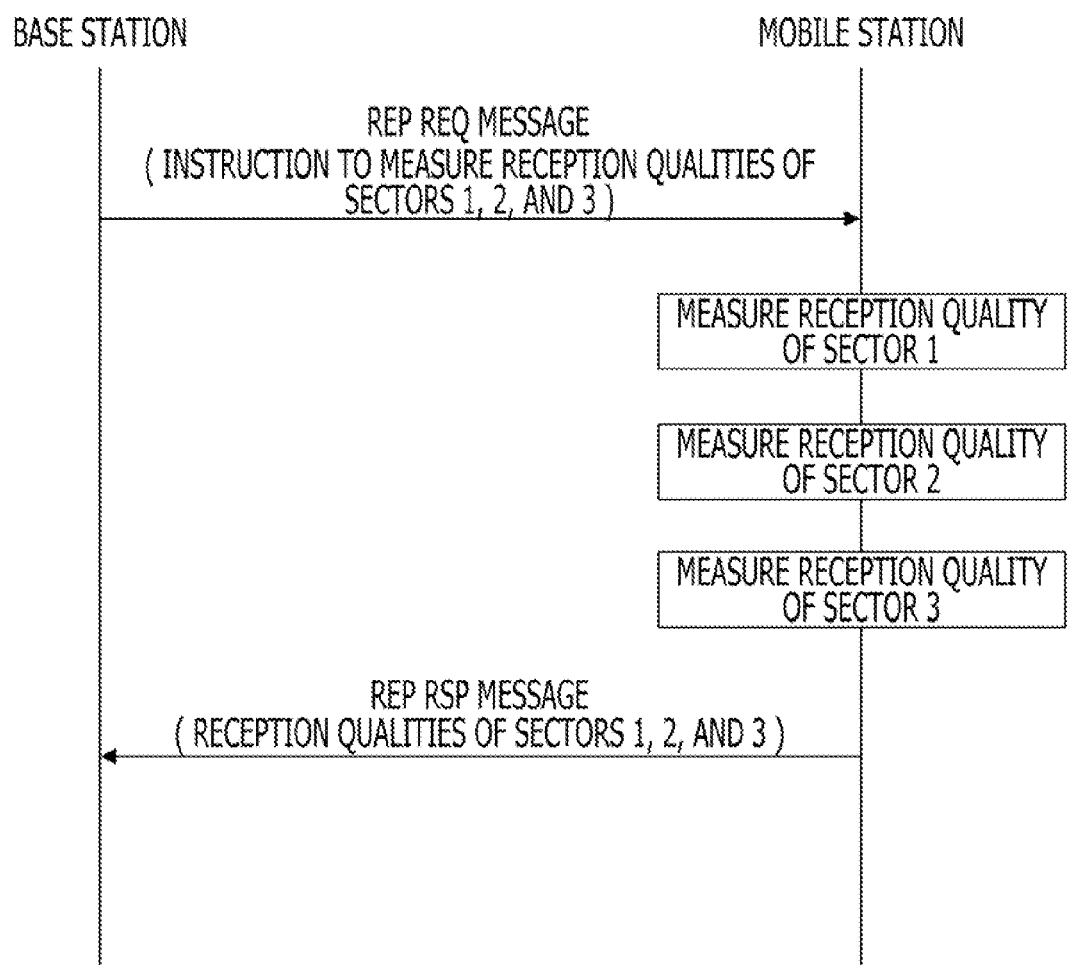
FIG. 17 is a diagram of an example of the flow of the base station for acquiring the reception qualities of individual sectors according to a third embodiment.

FIG. 17 illustrates an example of the flow of the base station 300 for acquiring the reception qualities of the individual sectors from a mobile station. The base station 300 instructs the mobile station to measure the reception qualities of the sectors of the mobile station by transmitting an REP REQ message to the mobile station. Here, the reception quality may be either an SINR or reception power. For the SINR, the mobile station measures a signal in the R3 zone that is not affected by interference from the adjacent sector. The mobile station that has received the REP REQ message measures the reception qualities of the individual sectors and feeds back the result to the base station 300 by inserting the result in an REP RSP message.

FIG. 18 illustrates an example of the flow of determining the adjacent sector of the mobile station based on the reception qualities of the individual sectors acquired in FIG. 17.

In step 1801, the position determination unit 342 of the base station 300 acquires the reception qualities of the individual sectors of the mobile station in accordance with the flow in FIG. 17.

In step 1802, the position determination unit 342 of the base station 300 compares the reception qualities of sectors other than the sector to which the mobile station is coupled to and selects the highest reception quality.

In step 1803, the position determination unit 342 calculates the difference between the reception quality from the sector to which the mobile station is coupled to and the reception qualities selected before. If the difference in reception quality is smaller than a threshold value of the reception quality that the base station 300 presets, then the flow moves to step 1804. If the difference in reception quality is greater than the preset threshold value of the reception quality, then the flow ends.

The preset threshold value of the reception quality is used to determine whether the base station is present at the sector boundary. The smaller the difference in distance between the mobile station and the individual sectors, the smaller the difference between the reception qualities. Accordingly, if the difference in reception quality is smaller than a certain threshold value, the mobile station may be assumed to be located at the boundary of two sectors substantially equally away from the measurement units 365 of the sectors. For example, in the mobile station, if the reception quality of the sector 1 (FIG. 1) and the reception quality of the sector 2 are substantially the same, and the difference therebetween is smaller than a certain threshold value, the mobile station may be assumed to be present at the boundary between the sector 1 and the sector 2 in FIG. 1.

On the other hand, the larger the difference in distance between the mobile station and the measurement unit 365 of the individual sectors, the larger the difference in reception quality. Accordingly, if the difference in reception quality is larger than a certain threshold value, the mobile station may be assumed to be present inside a sector at different distances from the measurement units 365 of the two sectors and away from the sector boundary. For example, in the mobile station, if the reception quality of the sector 1 (FIG. 1) and the reception quality of the sector 2 greatly differ, and the difference therebetween is greater than a certain threshold value, the mobile station may be assumed to be present inside the sector 1 or inside the sector 2 away from the sector boundary in FIG. 1.

In step 1804, the position determination unit 342 refers to the reception quality of the sector coupled thereto. If the reception quality of the coupled sector is higher than a preset threshold value of reception power, the flow moves to step 1805. If the reception quality is lower than the preset reception quality, the flow ends.

The present threshold value of reception quality is used to estimate the distance between the base station and the mobile station to determine whether the mobile station is present in the vicinity of the base station. The shorter is the distance between the mobile station and the measurement unit 365 of the sector, the higher is the distance from the sector. Accordingly, if the reception quality is higher than a certain threshold value, the distance between the mobile station and the base station may be assumed to be shorter than a distance corresponding to the threshold value. The distance between the base station and the mobile station may also be estimated from the transmission power of the mobile station as in the first embodiment.

In step 1805, the position determination unit 342 stores the sector selected in step 1802 in the storage unit 344 as an adjacent sector. The position determination unit 342 may notify the adjacent sector to the scheduling unit 341.

In the process of FIG. 18, the position determination unit 342 determines whether the mobile station is located at the sector boundary by comparing the reception quality from a sector to which the mobile station coupled with the reception qualities from other sectors. Furthermore, the position determination unit 342 determines whether the mobile station is present in the vicinity of the base station from the reception quality of the mobile station from a sector coupled thereto. The adjacent sector set in the process of FIG. 18 is stored as the adjacent sector number in FIG. 4.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station configuring a plurality of sectors adjacent to one another and controlling communication with a plurality of mobile stations, the base station comprising:
    a position determination unit configured to determine, for the mobile stations, a mobile station present in a first sector boundary portion of a first sector within a communication area of the base station, the first sector boundary portion being adjacent to a second sector within the communication area of the base station, each sector including at least one sector boundary portion and at least one other portion; and
    a scheduling unit configured to allocate, to the determined mobile station, a frequency domain which is allocated to the second sector but unused in the second sector.

2. The base station according to claim 1, wherein the position determination unit determines that the mobile station is present at the first sector boundary portion based on reception qualities measured in the plurality of sectors or reception qualities of the plurality of sectors measured by the mobile station.

3. The base station according to claim 1, wherein the determined mobile station is present in the vicinity of the base station and the position determination unit determines that the mobile station is present in the vicinity of the base station based on any of transmission power of the mobile station, reception quality of the mobile station measured by the sector coupled to the mobile station, and reception quality of the sector coupled to the mobile station measured by the mobile station.

4. The base station according to claim 1, wherein if the frequency domain is allocated to the determined mobile station, the scheduling unit disables allocation of the same frequency domain to the adjacent sector.

5. The base station according to claim 1, wherein if the frequency domain is allocated to the determined mobile station, the scheduling unit allocates, in the adjacent sector, the same frequency domain to the determined mobile station to send the same data to the determined mobile station.

6. A scheduling method of a base station configuring a plurality of sectors adjacent to one another and controlling communication with a plurality of mobile stations, the method comprising:
    determining, for the mobile stations, a mobile station present in a first sector boundary portion of a first sector within a communication area of the base station, the first sector boundary portion being adjacent to a second sector within the communication area of the base station, each sector including at least one sector boundary portion and at least one other portion; and
    allocating, to the determined mobile station, a frequency domain which is allocated to the second sector but unused in the second sector.

7. The scheduling method according to claim 6, wherein the determining determines that the mobile station is present at the first sector boundary portion based on reception qualities measured in the plurality of sectors or reception qualities of the plurality of sectors measured by the mobile station.

8. The scheduling method according to claim 6, wherein the determined mobile station is present in the vicinity of the base station and the determining determines that the mobile station is present in the vicinity of the base station based on any of transmission power of the mobile station, reception quality of the mobile station measured by the sector coupled to the mobile station, and reception quality of the sector coupled to the mobile station measured by the mobile station.

9. The scheduling method according to claim 6, wherein if the frequency domain is allocated to the determined mobile station, the allocating disables allocation of the same frequency domain to the adjacent sector.

10. The scheduling method according to claim 6, wherein if the frequency domain is allocated to the determined mobile station, the allocating allocates, in the adjacent sector, the same frequency domain to the determined mobile station to send the same data to the determined mobile station.

* * * * *